(12) United States Patent
Banavara

(10) Patent No.: US 9,535,638 B2
(45) Date of Patent: *Jan. 3, 2017

(54) DIRECTLY TRANSFERRING DATA BETWEEN DEVICES

(71) Applicant: HEWLETT-PACKARD DEVELOPMENT COMPANY, L.P., Houston, TX (US)

(72) Inventor: Madhusudan R. Banavara, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/842,654

(22) Filed: Sep. 1, 2015

(65) Prior Publication Data

US 2015/0370516 A1    Dec. 24, 2015

Related U.S. Application Data

(63) Continuation of application No. 13/228,675, filed on Sep. 9, 2011, now Pat. No. 9,155,117.

(51) Int. Cl.
*G06F 15/16* (2006.01)
*G06F 3/12* (2006.01)
*H04W 76/02* (2009.01)
*H04L 29/12* (2006.01)
*H04W 92/02* (2009.01)
*H04W 92/18* (2009.01)

(52) U.S. Cl.
CPC ............ *G06F 3/1236* (2013.01); *G06F 3/122* (2013.01); *G06F 3/1224* (2013.01); *G06F 3/1286* (2013.01); *G06F 3/1292* (2013.01); *H04L 61/6022* (2013.01); *H04W 76/023* (2013.01); *H04W 92/02* (2013.01); *H04W 92/18* (2013.01)

(58) Field of Classification Search
USPC ................................. 709/227, 203, 226, 200
See application file for complete search history.

(56) References Cited

U.S. PATENT DOCUMENTS

| 8,391,203 | B1 | 3/2013 | Mangal |
| 2008/0313653 | A1 | 12/2008 | Malone et al. |
| 2009/0016300 | A1 | 1/2009 | Ahmavaara et al. |
| 2009/0303966 | A1 | 12/2009 | Cherian et al. |
| 2010/0100952 | A1 | 4/2010 | Sample et al. |
| 2011/0058479 | A1 | 3/2011 | Chowdhury |
| 2012/0076118 | A1 | 3/2012 | Montemurro et al. |

(Continued)

FOREIGN PATENT DOCUMENTS

WO    WO-2010052523 A1    5/2010

OTHER PUBLICATIONS

"The Future of Hotspots: Making Wi-Fi as Secure and Easy to Use as Cellular", Jun. 2011, 7 pages, Cisco.

(Continued)

*Primary Examiner* — El Hadji Sall
(74) *Attorney, Agent, or Firm* — Fabian VanCott

(57) ABSTRACT

A method for directly transferring data between devices includes, with a first computing system that is able to wirelessly associate with a computer network, establishing a direct data-link layer connection to a second computing system that is acting as a data sink, and with the first computing system transmitting data to the second computing system over the connection without transferring the data over the network.

20 Claims, 6 Drawing Sheets

(56) References Cited

U.S. PATENT DOCUMENTS

2012/0159595 A1  6/2012  Barham

OTHER PUBLICATIONS

Bahl et al., "MultiNet: Connecting to Multiple IEEE 802.11 Networks Using a Single Wireless Card," Aug. 2003, Technical Report, MSR-TR-2003-46, Microsoft Research, <http://research.microsoft.com/pubs/70012/tr-2003-46.pdf>.
eHow Contributor, "How to Connect a Printer using Bluetooth," Aug. 20, 2010, <http://web.archive.org/web/20100820003749/http://www.ehow.com/how_2005869_connect-printer-bluetooth.html>.
Hewlett-Packard Development Company, L.P., "HP Photosmart C6100 All-in-One Series—Bluetooth Printing," Oct. 15, 2006, HP Support, <http://support.hp.com/us-en/document/c00721726>.
Curtis Franklin, "How to Share Printers on a Network," Aug. 23, 2010, (web page), <http://www.pcworld.com/article/203625/how_to_set_up_network_printing.html>.
Jim Clark, "Hands on: Pogoplug Pro," Mar. 14, 2011, <http://www.wegotserved.com/2011/03/14/hands-pogoplug-pro/>.
Lexmark, "Printer Not Communicating on the Network; Preliminary Wired or Wireless Network Troubleshooting," Jul. 18, 2010, (web page), http://support.lexmark.com/index?pmv=print&page=content&locale=en&productCode=LEXMARK_E260&segment=SUPPORT&userlocale=EN&id=SO4658>.
Ricoh, "Adding a Bluetooth Printer," Sep. 12, 2008, <http://support.ricoh.com/bb_v1oi/pub_e/oi_view/0001036/0001036377/view/netsys/unv/0264.htm>.
Samara Lynn, "Wi-Fi Direct: What You Need to Know," Oct. 25, 2010, PCMag.com, <http://www.pcmag.com/article2/0,2817,2371413,00.asp>.
SuperUser, "Can a Linux machine act as both a wireless client and access point simultaneously using a single physical WLAN interface?," Jun. 23, 2010, <http://superuser.com/questions/166796/can-a-linux-machine-act-as-both-a-wireless-client-and-access-point-simultaneousl>.
WikiHow, "How to Connect to a Network Printer," May 10, 2011, <http://web.archive.org/web/20110510033803/http://www.wikihow.com/Connect-to-a-Network-Printer>.
Wikipedia, "Bluetooth," Aug. 27, 2011, <http://en.wikipedia.org/w/index.php?title=Bluetooth&oldid=446935674>.
Wikipedia, "Data link layer," Aug. 30, 2011, <http://en.wikipedia.org/w/index.php?title=Data_link_layer&oldid=447462826>.
IEEE Computer Society, "IEEE Standard for Information technology—Telecommunications and information exchange between systems—Local and metropolitan area networks—Specific requirements," Part 11: Wireless LAN Medium Access Control (MAC) and Physical Layer (PHY) Specifications; Amendment 9: Interworking with External.

DIRECTLY TRANSFERRING DATA BETWEEN DEVICES

BACKGROUND

As the use of wireless communication technology becomes more ubiquitous, Wireless Local Area Networks (WLAN) are becoming more common. A WLAN includes a number of devices that are connected to each other over a wireless network. A common setup is to have a number of client devices establish a connection to a wireless access point. As these client devices connect to a particular wireless access point, they are associating with a particular network. A device that is associated with a particular network is able to communicate with other devices on that network within the constraints of any security policies which may be in place. However, if a device associated with a particular network desires to communicate with a device outside that network, the communication data will have to be processed by a router.

Oftentimes, a user of a particular computing device will be connected to a particular network and wish to use the services of a device connected to a different network. For example, a user may wish to send a document to a particular printer. However, it may be the case that that printer is associated with a different network than the one with which the user's device is associated. In this case, the user will have to disconnect his or her device from its current network and then associate that device with the same network with which the printer is associated. Alternatively, a network administrator may have set up the network so that certain communications between networks are allowed. However, such a setup consumes network resources.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

Figure 1:
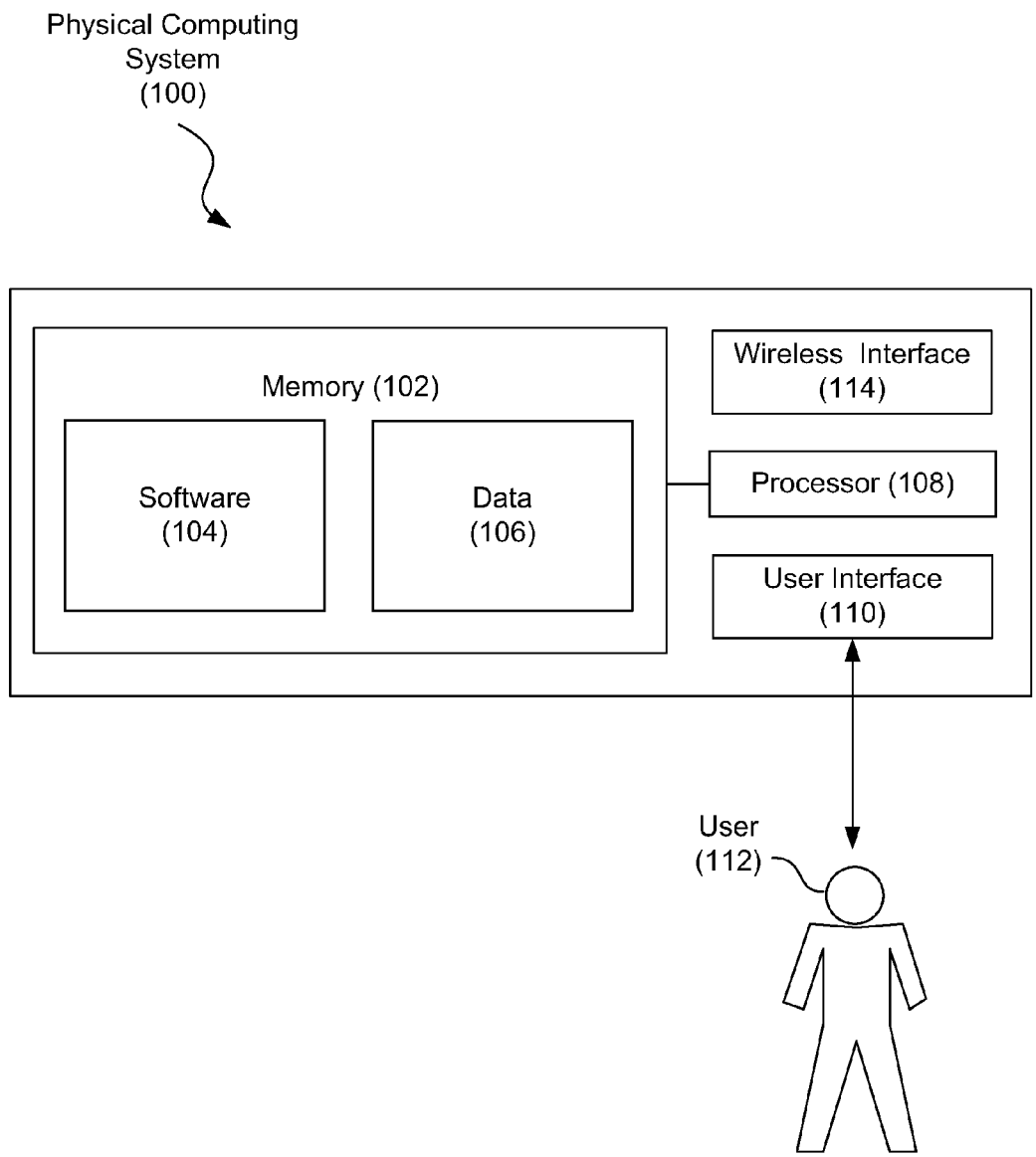
FIG. 1 is a diagram showing an illustrative physical computing system, according to one example of principles described herein.

As mentioned above, a user of a particular computing device may wish to send a send a document to a particular printer that is associated with a different network than the one with which the user's device is associated. In this case, the user will have to disconnect his or her device from its current network and then associate that device with the same network with which the printer is associated. This can be time consuming and frustrating for the user. Alternatively, a network administrator may have set up the network so that certain communications between networks are allowed. However, such a setup consumes network resources.

In light of this and other issues, the present specification discloses methods and systems for allowing devices that are associated with a particular network directly connect to devices not associated with that network. Thus, no network resources are unnecessarily consumed.

For example, a user of a laptop computer may attempt to use the service of a particular printing device. If that printing device is on the same network in which the user's laptop computer is connected, then the user can readily print to that device as long as the laptop computer has the necessary software and device drivers to do so. However, if that printing device is on a different network, then the user will be unable to access that printing device.

According to certain illustrative embodiments, in response to determining that the printing device is not on the same network with which the laptop computer is currently associated, the laptop computer will determine if it can communicate directly with the printing device. The printing device may be wirelessly associated with a different network and thus is capable of wireless communication. The laptop computer can send out a signal that lets any devices within range know that the laptop computer is looking for a particular printing device. Upon receiving that signal, the printing device may respond to let the laptop computer know of its presence. A connection can then be established directly between the two devices. In one example, this communication may be accomplished using General Advertisement Services (GAS) exchanges.

After the connection between the laptop computer and the printing device is established, the document may be sent to the printer for printing. This is done on the data-link layer of the Open Systems Interconnect (OSI) networking model. The data-link layer defines the various protocols used to transfer data between two points within the same Local Area Network (LAN). The data-link layer connection is often referred to as a level 2 connection. Essentially, a new LAN is created that consists of only the laptop computer and the printing device. Once the transmission of data is complete, this connection may be ended. Various security protocols may be put in place to ensure that not any computing device can connect to a particular device.

Through use of methods and systems embodying principles described herein, a more efficient manner of transferring data between devices on different networks is realized. Specifically, a user does not have to disconnect from one network to associate with the network of a particular device. Additionally, no complicated network setup is needed to allow certain devices to communicate with each other across networks.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Throughout this specification and in the appended claims, the term data source refers to any computing device that transmits data to another device. Some examples of data sources include laptop computers, tablet computer, and mobile smart phones.

Throughout this specification and in the appended claims, the term "data sink" refers to any physical device that receives data from another physical device. Some examples of data sinks include printing devices, display devices, and sound emanating devices such as media players.

Throughout this specification and in the appended claims, the term "direct connection" or "direct level 2 connection" refers to a connection that involves protocols used by the data-link layer of the OSI networking model.

Referring now to the figures, FIG. 1 is a diagram showing an illustrative physical computing system (100) to be used either as a data source or data sink. According to certain illustrative examples, the physical computing system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the physical computing system.

A user interface (110) may provide a means for the user (112) to interact with the physical computing system (100). The user interface may include any collection of devices for interfacing with a human user (112). For example, the user interface (110) may include an input device such as a keyboard or mouse and an output device such as a monitor.

A wireless interface (114) is used to communicate with other computing systems capable of wireless communication. Wireless communication between devices is done by modulating electromagnetic waves being transmitted at certain frequencies. Wireless networking devices typically operate on either the 2.4 GHz frequency band or the 5 GHZ frequency band according to the 802.11 networking standards as defined by the Institute of Electrical and Electronics Engineers (IEEE).

Figure 2:
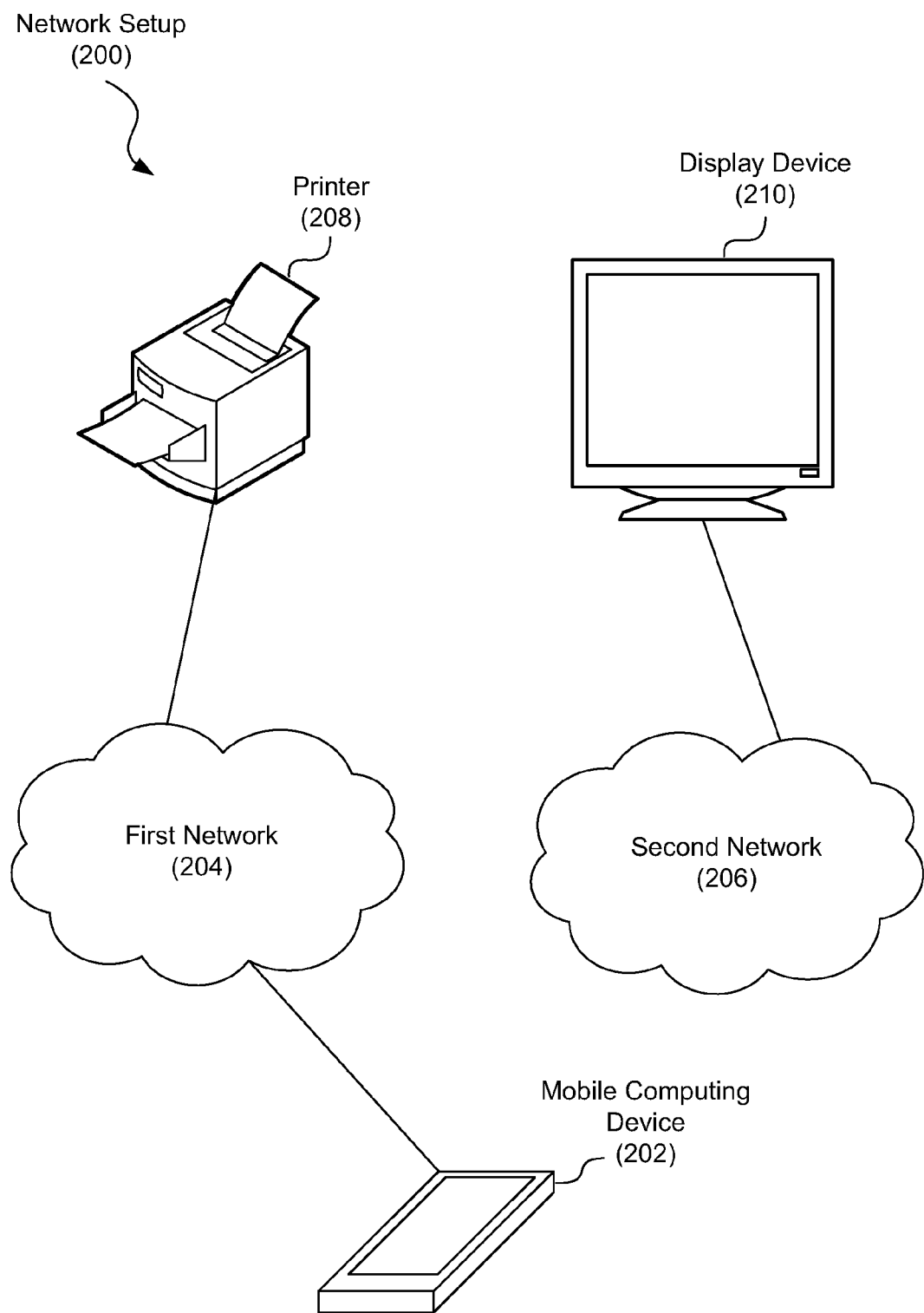
FIG. 2 is a diagram showing an illustrative network setup, according to one example of principles described herein.

FIG. 2 is a diagram showing an illustrative network setup (200). According to certain illustrative examples, a particular data source such as a mobile computing device (202) may have multiple networks available with which it may associate. Networks are typically identified by a Service Set Identifier (SSID). The user will typically select an available network by its SSID and enter the password, if necessary, in order to connect to that network. Many locations will have multiple networks overlapping with which the user may connect.

There may be several reasons for multiple networks in one location. It may be the case that the network administrator created multiple networks for security purposes. Particularly, some devices may only be allowed to associate with one network while other devices are only allowed to associate with another network. It may also be the case that different networks may be designed for specific locations within a facility. However, there will be an overlap in the range of those networks. Thus, a user near the edge of the range for one network might be on the edge of the range for another network.

In the example shown in FIG. 2, a mobile computing device (202) is associated with a first network (206). While being associated with this first network, the mobile computing device (202) is able to communicate with other devices that are also associated with that network (204). For example, the mobile computing device may send data to the printer (208) for printing because that printer is connected to the same network.

It may be the case that the user of the mobile computing device (202) wishes may wish to use a display device (210) to make a presentation with data on his or her mobile computing device (202). In this case, the user would send that data to a display device (210) over the network. However, the user's mobile computing device (202) is not associated with the second network (206) with which the display device (210) is associated. As mentioned above, in such cases, the user would have to cause the mobile computing device (202) to disconnect from the first network (204) so that the device can be associated with the second network. This can be troublesome task for many users.

Figure 3:
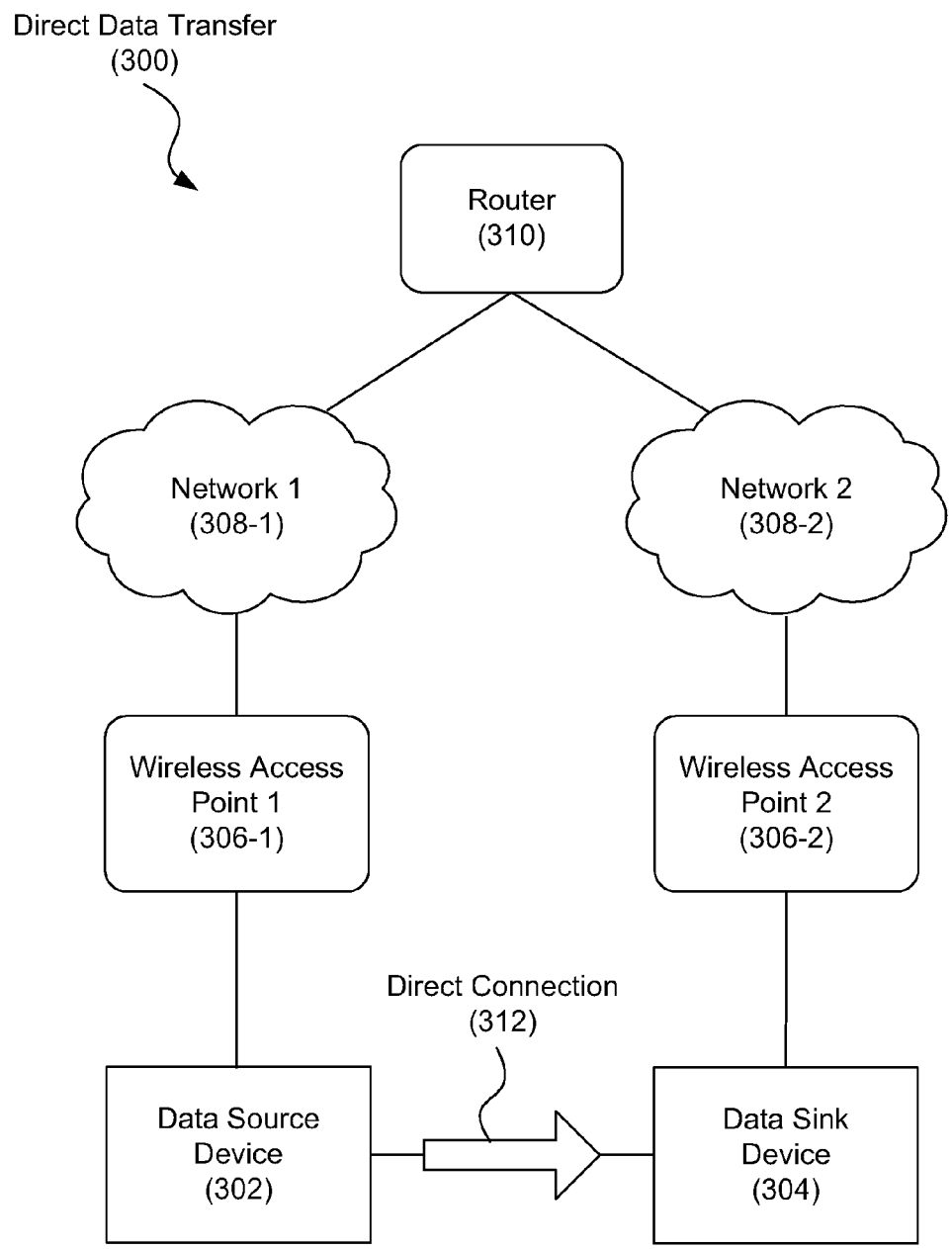
FIG. 3 is a diagram showing an illustrative transfer of data between devices, according to one example of principles described herein.

FIG. 3 is a diagram showing an illustrative transfer of data between devices. As mentioned above, one way of transferring data between devices on different networks is to have the network set up so that the data can be routed by a router (310). In this case, the data source device would transmit data to the wireless access point (306-1) that the data source device (302) uses to connect to a first network (308-1). That data would then be sent through that network to a router (310). The router (310) would then forward that data to a second network (308-2). That data would eventually reach the wireless access point (306-2) with which a target data sink device (304) uses to connect to the second network (308-2). This process consumes a lot of network resources. If the size of the data to be transferred to between the source device (302) and the sink device (304) is large, then a significant amount of network bandwidth may be consumed.

In light of this issue, the present specification discloses methods for establishing a direct level 2 connection (312) between a data source device (302) associated with a first network (308-1) and a data sink device (304) associated with a second network (308-2). This direct level 2 connection does not involve use of the network stack for the networks with which the devices are associated.

Figure 4:
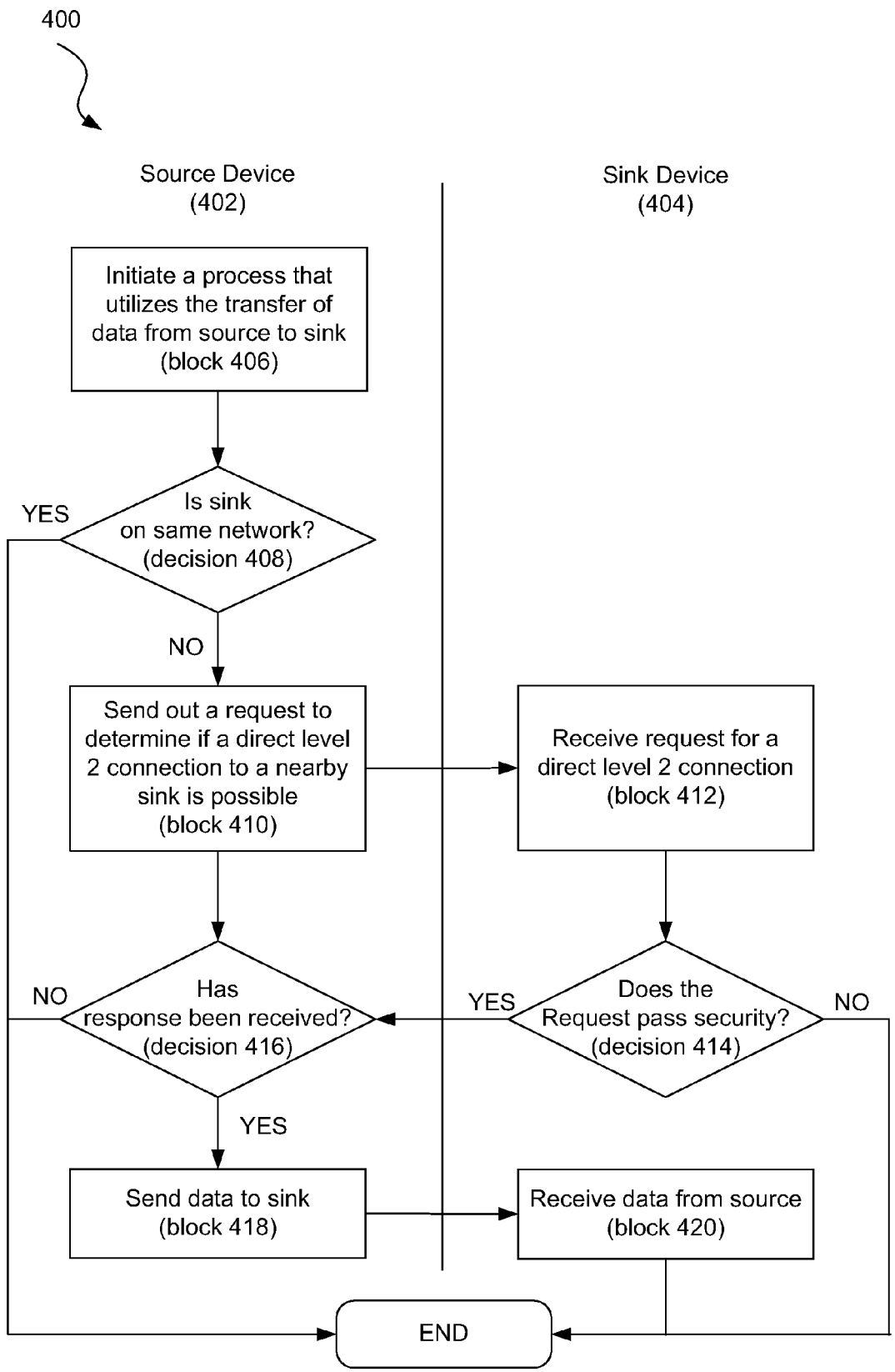
FIG. 4 is a flowchart showing an illustrative process for transferring data directly between devices, according to one example of principles described herein.

FIG. 4 is a flowchart showing an illustrative process for transferring data directly between devices. The objects on the left side of the center line represent actions performed by a data source device (402). Objects on the right side of the center line represent actions performed by a data sink device (404).

According to certain illustrative examples, the process (400) beings when the data source initiates (block 406) a process that utilizes the transfer of data from a source device (402) to a sink device (404). For example, if a user has an open document on his or her laptop device which is acting as a data source, and he or she engages a print option, then that will initiate a process that requires the transfer of data from the laptop device to the printing device. In a further example, if a user executes a program that is designed to stream visual data to an external display device over a network, then doing so will initiate a process that utilizes the transfer of data.

After a data transfer process has been initiated, it will then be determined (decision 408) whether or not the target sink device is on the same network as the source device (402). If it is determined (decision 408, YES) that the sink device (404) is indeed on the same network as the data source device (402), then the standard networking methods for transferring data will be used and no special operation is warranted. However, if it is determined (decision 408, NO) that the sink device (404) is not on the same network as the data source device (402), then the source device (402) will attempt to establish a direct level 2 connection to the sink device (404).

In order to establish this direct level 2 connection, the data source device (402) will send (block 410) out a request signal to determine if the data sink device (404) is within range of the data source device (402). In one example, this is done using Generic Advertisement Service (GAS) exchanges. GAS exchanges are defined by the 802.11u networking standards. In a further example, customized packet frames may be used. In this case, a particular computer application that is running on the source device may be designed for allowing direct connection using network packets that are structured specifically for that application. Various sink devices may also be equipped to handle such customized packets.

If there is a data sink device (404) within range of the data source device, then that data sink device (404) will receive (block 412) the request signal. In general, it is preferred that a sink device (404) include some type of security mechanism. With such a mechanism in place, only authorized devices will be allowed to transmit data to the sink device (404). It is thus determined (decision 412) whether or not the source device (402) passes the security mechanism. If the source device does not (decision 414, NO) pass the security mechanism, then no data is allowed to be transferred and the process is ended. However, if the source device (402) does indeed (decision 414, YES) pass the security mechanism, then the sink device (404) will respond accordingly so that a level 2 connection may be established between the source device (402) and the sink device (404).

In one example, a security mechanism may be to configure the sink device with a list of devices which are allowed to transmit data to the sink device (404). Any device which is not on that list that attempts to connect to the sink device will fail to pass the security test. Devices may be identified through a number of methods. For example, a device may be identified by a device name or a Media Access Control (MAC) address.

In one scenario, a particular organization may operate several networks. Each member of that organization may have a computing device assigned to a particular network. However, when a user roams to a different region within the facility and wishes to use a sink device, then that user may establish a direct connection with that sink device. The sink device may be configured to accept a direct level 2 connection to any device associated with the particular organization. Thus, the user's device will pass the security feature and the direct level 2 connection will be established.

In a further example of a security feature, a sink device may be configured to only respond to a certain type of request signal. The request signal may be encoded in a particular matter or include identification data that the sink device is set to recognize. Any source device (402) that is allowed to access that sink device (404) will thus be configured to send out the appropriate signal that is either coded or includes the proper data that will allow it to connect to a particular sink device.

After the source device (402) sends out the request, it will then wait for a response. In some cases, the source device (402) will be set to wait for a particular period of time before determining that there is no sink device within range. If it is determined (decision 416, NO) that no response has been received and thus there is no sink device within range, the process ends. However, if it is determined (decision 416, YES) that an appropriate response has been received and there is a sink device (404) within range, then a direct connection can be established.

With the direct level 2 connection established between the source device (402) and the sink device, the source device (402) will send (block 418) the appropriate data to the sink device. Upon receiving (block 420) the data from the source device (402), the sink device (404) will process that data accordingly. For example, if the sink device (404) is a printer, then that printer will print the data that was received. If the sink device (404) is a display device, then it will display the data that was received.

The direct level 2 connection essentially creates a new network. This new network is structured as a peer-to-peer setup rather than a client/server setup. This peer-to-peer network may be configured to be disconnected immediately after the data transfer is complete. For example, after a document has finished transferring to the printer, the direct connection may be ended. Thus, the wireless networking interfaces of both the source device (402) and the sink device (404) are not unnecessarily used to maintain this network. In some cases, the source device may still maintain its connection to the main network with which it is associated. Some wireless interface hardware and driver software is such that a device can be connected to multiple networks simultaneously.

In some examples, the various source devices which are authorized to form a direct level 2 connection to a particular sink device may have a specific application installed which allows for such direct connection. This application may encompass any security features such as those described above. The application may manage the creation of direct level 2 connections to sink devices when appropriate. Such applications may be installed on computing devices operated by users of a particular organization. As mentioned above, such applications may also use customized packet frames.

Figure 5:
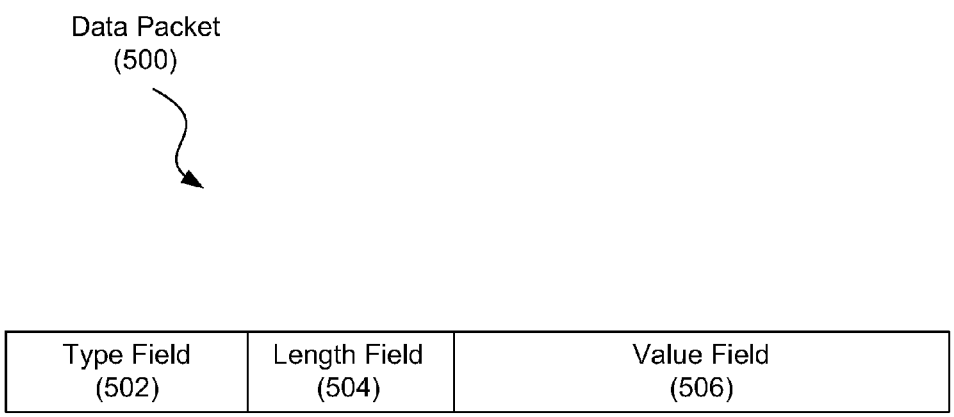
FIG. 5 is a diagram showing an illustrative network packet, according to one example of principles described herein.

FIG. 5 is a diagram showing an illustrative network packet. According to certain illustrative examples, the protocols involved in the direct level 2 connection between a sink device and source device may utilize Type-Length-Value (TLV) elements. TLV elements are used to encode data within a protocol. A TLV element includes a type field (502), a length field (504), and a value field (506). The type field (504) is typically a fixed sequence of bits that defines the type of data within the packet. The length field (504) identifies the length of the value of the packet. The value field (506) is of a length indicated by the length field (504) and includes a set portion of the data to be transmitted.

Figure 6:
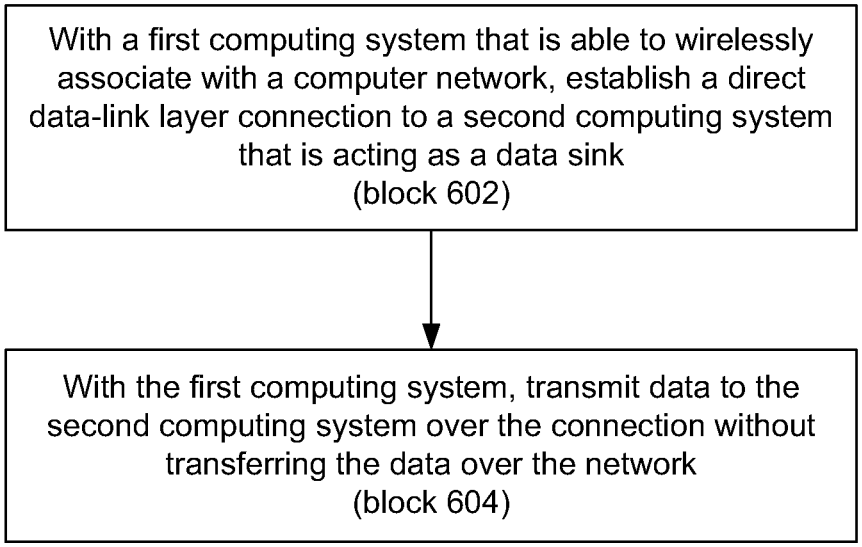
FIG. 6 is a flowchart showing an illustrative method for transferring data directly between devices, according to one example of principles described herein.

FIG. 6 is a flowchart showing an illustrative method for transferring data directly between devices. According to certain illustrative examples, the method includes, with a first computing system that is able to wirelessly associate with a computer network, establishing (block 602) a direct data-link layer connection to a second computing system that is acting as a data sink, and with the first computing system, transmitting (block 604) data to the second computing system over the connection without transferring the data over the network.

In conclusion, through use of methods and systems embodying principles described herein, a more efficient manner of transferring data between devices on different networks is realized. Specifically, a user does not have to disconnect from one network to associate with the network of a particular device. Additionally, no complicated network setup is needed to allow certain devices to communicate with each other across networks.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for directly transferring data between computing devices, the method comprising:
   in response to a determination that a first computing system is not on the same computing network with which a second computing system is currently associated, determining if the first computing system can communicate directly with the second computing system; and
   in response to a determination that the first computing system can communicate directly with the second computing system, establishing a wireless, direct data-link layer connection to the second computing system,
   wherein the first computing system transmits data to the second computing system over the direct data-link layer connection without transferring the data over the first network or interacting with any other computing device.

2. The method of claim 1, wherein the connection between the first computing system and the second computing system is defined by 802.11u networking standard.

3. The method of claim 1, wherein the connection utilizes Generic Advertisement Service (GAS) exchanges.

4. The method of claim 1, wherein the connection utilizes customized network packets.

5. The method of claim 1, further comprising:
   determining a media access control (MAC) address of the first computing system;
   determining whether the MAC address identifies a device included in a list of devices allowed to transmit data to the second computing system; and
   in response to a determination that the MAC address of the first computing device does identify a device included in the list of devices allowed to transmit data to the second computing system, transmitting data between the first computing system and the second computing system over the direct data-link layer connection.

6. The method of claim 1, further comprising:
   establishing a direct data-link layer connection to the second computing system in response to the second computing system acknowledging that the first computing system passes a security check, wherein the security check comprises:
      with an application installed on the first computing system, managing creation of the direct data-link layer connection to the second computing system, wherein the application allows for the creation of the direct data-link layer connection with the second computing system.

7. The method of claim 6, wherein the application uses customized packet frames in order to establish the direct data-link layer connection with the second computing system, the customized packet frames being structured for the application.

8. A computing system acting as a data source, the system comprising:
   at least one processor;
   a memory communicatively coupled to the at least one processor, the memory comprising computer executable code that, when executed by the at least one processor, causes the at least one processor to:
      establish a direct data-link layer connection to a data sink device, the computing system being located on a first network and the data sink device being located on a second network; and
      transmit data between the computing system and the data sink device over the direct data-link layer connection without involving network stacks of the first network and the second network.

9. The system of claim 8, wherein establishing a direct data-link layer connection to the data sink device comprises with an application running on the computing system, sending a number of customized packet frames to the data sink device, the customized packet frames being structured to be handled by the data sink device.

10. The system of claim 8, wherein the first computing system maintains a connection to the first network while transmitting the data to the data sink device.

11. The system of claim 8, wherein the data sink device allows communication between a list of computing systems, wherein the data sink device determines whether the first computing system is included in the list.

12. The system of claim 8, further comprising computer executable code that, when executed by the at least one processor, causes the at least one processor to:
   determine whether the computing system is on the same computing network with which the data sink device is currently associated;
   in response to a determination that the computing system is not on the same computing network with which the data sink device is currently associated, determining if the computing system can communicate directly with the data sink device; and
   in response to a determination that the computing system can communicate directly with the data sink device, establishing the direct data-link layer connection to the data sink device.

13. The system of claim 12, wherein the computing system transmits data to the data sink device over the direct data-link layer connection without transferring the data over the first network or the second network or interacting with any other computing device.

14. The system of claim 8, wherein the data sink device is a printing device.

15. A method for directly transferring data between computing devices, comprising:
   in response to a determination that a data sink device is not part of a network associated with a data source device, broadcasting a signal to determine if the data sink device is within a wireless range of the data source device; and
   in response to the data sink device acknowledging that the data source device passes a security check, establishing a direct data-link layer connection to the data sink device.

16. The method of claim 15, comprising transmitting data between the data source device and the data sink device over the direct data-link layer connection without transferring the data over the network.

17. The method of claim 15, wherein the security check comprises:
   determining a media access control (MAC) address of the data source device;

determining whether the MAC address identifies a device included in a list of devices allowed to transmit data to the data sink device; and in response to a determination that the MAC address of the data source device does identify a device included in the list of devices allowed to transmit data to the data sink device, transmitting data between the data source device and the data sink device over the direct data-link layer connection.

18. The method of claim 15, wherein the security check comprises:

with an application installed on the data source device, managing creation of the direct data-link layer connection to the data sink device, wherein the application allows for the creation of the direct data-link layer connection with the data sink device.

19. The method of claim 15, wherein the application uses customized packet frames in order to establish the direct data-link layer connection with the data sink device, the customized packet frames being structured for the application.

20. The method of claim 15, wherein the data source device transmits data to the data sink device over the direct data-link layer connection without transferring the data over the network associated with the data source device or interacting with any other computing device.

* * * * *